April 5, 1960     L. MILLS     2,931,444
CURB EDGING PLOWS
Filed Jan. 25, 1956     3 Sheets-Sheet 1
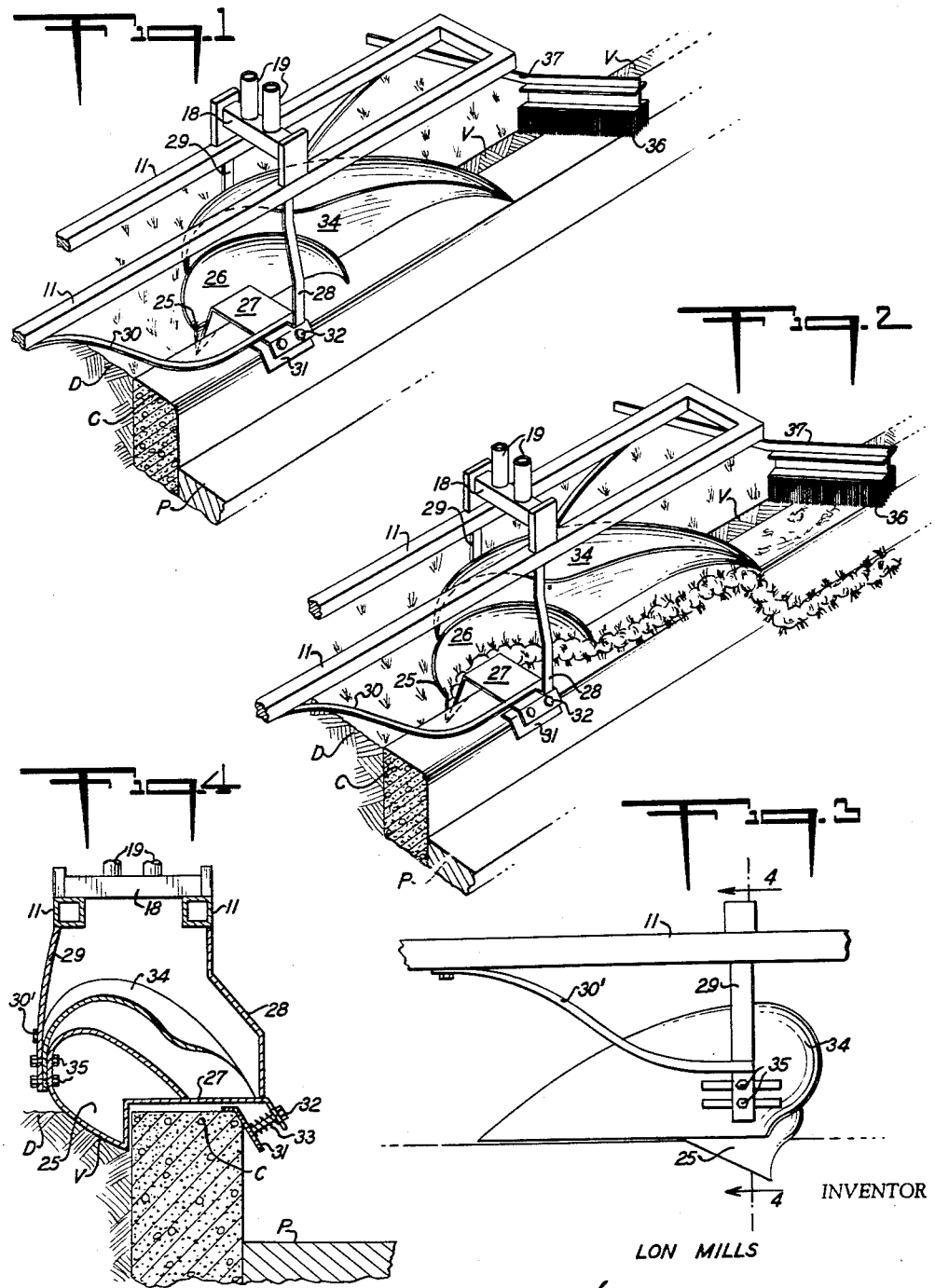
INVENTOR
LON MILLS
BY
ATTORNEY

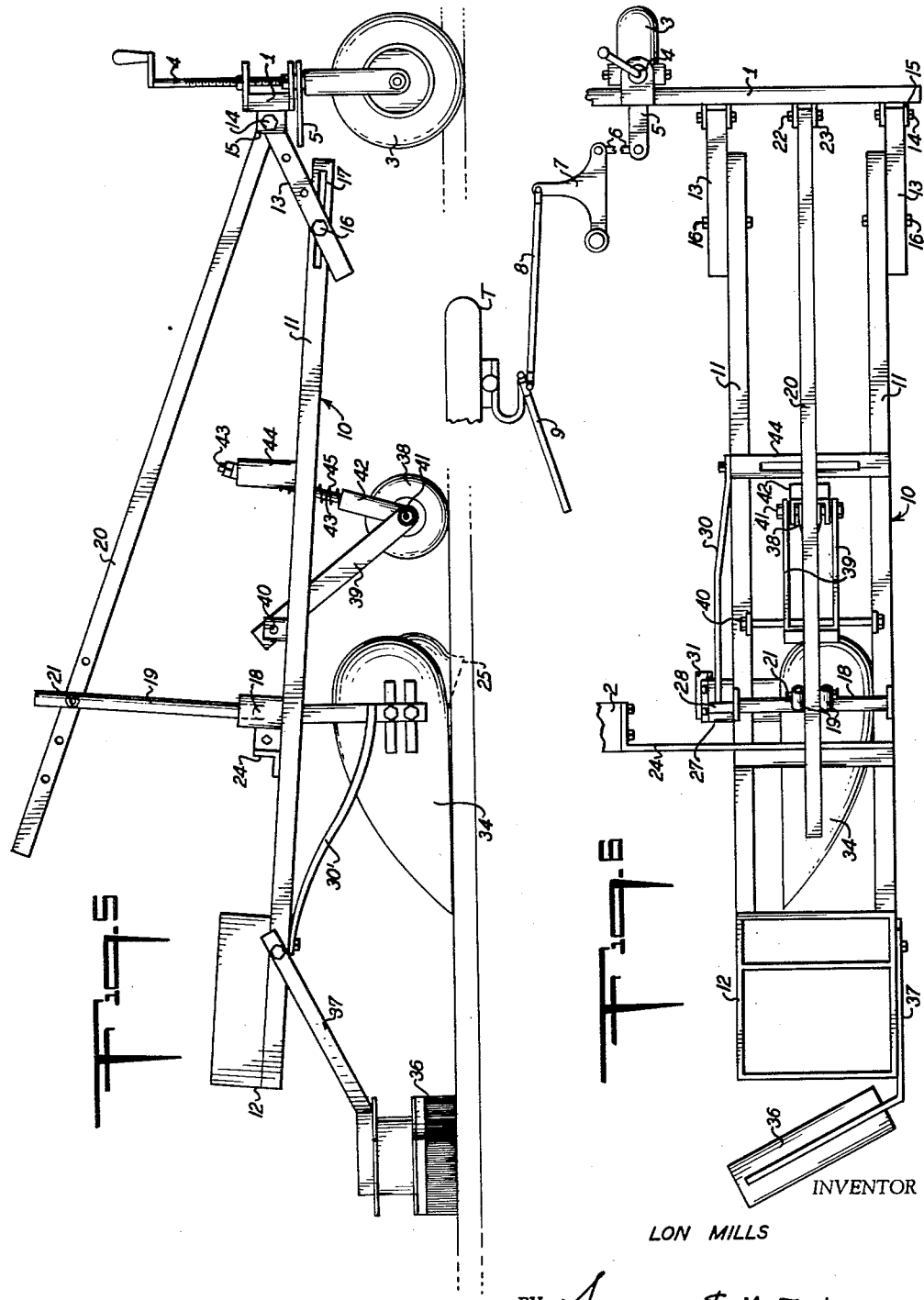

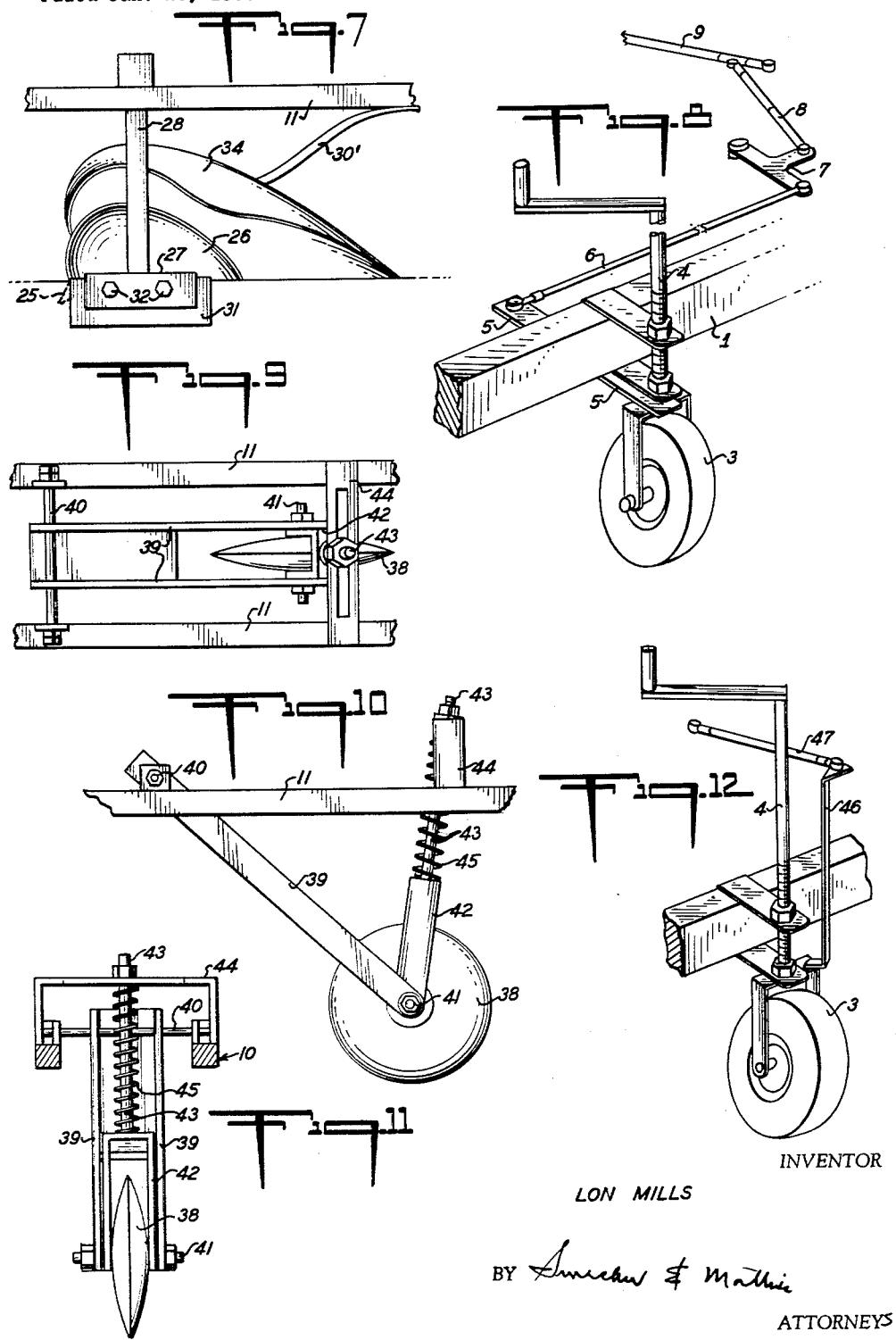

United States Patent Office 2,931,444
Patented Apr. 5, 1960

2,931,444

CURB EDGING PLOWS

Lon Mills, Knoxville, Tenn.

Application January 25, 1956, Serial No. 561,239

8 Claims. (Cl. 172—13)

This application is a continuation-in-part of my prior application for Edging Tools, Serial No. 478,347, filed December 29, 1954, now abandoned.

This invention relates to improvements in curb edging plows adapted for cutting and removing grass and dirt along the edge of a curb or along the edge of a pavement.

The curbs provided along highways, streets, and the like, are usually employed for the purpose of confining the dirt and grass, to keep it from overgrowing and falling over the edge of the pavement. Many types of grasses are of rather rampant growth, and when planted along parkways of this character, will provide an overgrown condition along the edge of the pavement, presenting an unsightly appearance.

Many attempts have been made heretofore to provide tools for removing the overgrown grass and dirt, but these have not been satisfactory for various reasons. Consequently, it has been the practice heretofore to use manual labor for this purpose, whenever any attempt is made to remove the excess grass and dirt, but more often, because of the expense involved for manual labor and the great difficulty encountered, the unsightly condition is allowed to remain.

One object of this invention is to improve the construction of machines for this purpose, to provide a plow of simple and inexpensive construction, which is effective for trimming the grass along the edge of a curb or pavement and presenting a neat and trim appearance to the latter.

Another object of the invention is to provide a simple and inexpensive plow which may be attached to a tractor or power operated vehicle, capable of movement along the edge of a curb or pavement, and which will cut the ragged edges of the grass growing along the curb and form a neat channel therealong, removing the dirt to a lateral position where it will leave the curb or pavement in a neat and attractive condition.

Still another object of the invention is to improve the constructon of edging plows, of the character described, by providing therein not only for cutting the grass along the edge of a curb or pavement and the plowing out and removal of the dirt therealong, but also for lateral discharge of the dirt and clippings, as well as any rocks encountered, over the edge of the curb and into the street or onto the pavement from where it may be shoveled into a truck and hauled away.

These objects may be accomplished, according to certain embodiments of this invention, by the provision of a plow shaped to form a V-shaped cut in the earth, with means for drawing the plow along the edge of a curb or pavement and in guided relation thereto so as to form the necessary groove therein. At the back of the plow, a deflecting mold board is provided, arranged to extend laterally therefrom over the edge of the curb or pavement, to direct the removed material, such as grass, dirt, rocks, etc., over onto the surface of the highway or street, from where it may be shoveled into a truck and removed.

A brush may be provided for sweeping the fine dirt into the street, off the curb if needed.

These embodiments of the invention are illustrated in the accompanying drawings, in which:

Fig. 1 is a perspective view showing the edging plow from the front;

Fig. 2 is a similar view showing the action of the plow;

Fig. 3 is a side elevation of the mold board and plow, with a part of the structure omitted;

Fig. 4 is a cross section thereof, on the line 4—4 in Fig. 3;

Fig. 5 is a side elevation of the full plow structure, taken at the same side as Fig. 3;

Fig. 6 is a top plan view of the edging plow;

Fig. 7 is a side elevation taken at the opposite side from Fig. 3;

Fig. 8 is a perspective view of the steering wheel and associated structure;

Fig. 9 is a detail top plan view of the coulter;

Fig. 10 is a side elevation thereof;

Fig. 11 is a front elevation thereof, parts being in section; and

Fig. 12 is a perspective view of a modified form of steering wheel.

While the invention may be embodied in a manually pushed or pulled implement, or applied to any suitable type of traction vehicle, it is shown as applied to a conventional four-wheeled, self-propelled tractor, generally indicated at T, such as of the type which may be used for operating a sickle bar mowing machine for mowing the grass along the edges of a street or highway. The tractor or vehicle T is adapted to travel along the surface of the pavement P, and frequently, such a pavement is provided with a raised curb C along the edge thereof, for retaining and holding the fill dirt and grass, as indicated generally at D. The purpose of the implement is to cut a V-shaped channel or groove, generally indicated at V in Figs. 1 and 2, in the dirt D along the edge of the curb C, as well as to trim the grass and to remove any refuse, rocks, dirt, etc., from this region adjacent the curb or present a neat appearance thereto.

The edging plow structure is adapted to be mounted beside the tractor T, according to the embodiment of the invention illustrated in the drawings, and may be secured thereto in any suitable manner, according to the character of tractor with which it is used. An arm or arms may extend laterally from the tractor for connection with the edging plow structure.

As shown in Figs. 5 and 6, a support member or arm 1 extends transversely at the front of the tractor T, being secured in suitable manner to the frame structure thereof and supported thereby. A support should be provided also at the rear of the tractor, as indicated at 2 in Fig. 6. The rear support may be connected, for example, to the power lift mechanism of the tractor or to other convenient means, for raising and lowering movement with respect to the surface of the ground, so as to position the plow structure in proper operative relation to the curb or pavement or raise it to a carrying position.

A better balanced support for the front of the mechanism is provided by a wheel 3 of the steering wheel type in support engagement with the transverse arm 1 and capable of being raised and lowered with respect thereto by means of a screw member 4 that may be hand operated, as illustrated. As shown in Figs. 6 and 8, the wheel 3 can be turned in proper relation to the steering of the tractor, having an arm 5 extending laterally therefrom and connected by a link 6 which extends to a bell-crank lever 7. The bell-crank lever 7 in turn is connected by a link 8 with the steering mechanism, generally indicated at 9, and provided for steering the wheels of the tractor. In this way, the wheel 3 will be turned to synchronize with the steering wheels of the tractor so as to follow the direction of the latter. This wheel may be positioned directly forward of the front wheel where the tractor is of the 4-wheel type or may be positioned directly forward of the rear wheel, if the tractor is of the tricycle type. In either event, it will support the front end of the curb edging plow structure without interfering with the proper steering and guidance of the tractor, and will follow directly therewith.

The plow structure, that is disposed beside the tractor in this embodiment of the invention, comprises a frame, generally indicated at 10, and includes side bars 11 spaced apart and connected together at their rear ends by suitable bracing means, generally indicated at 12. The front ends of the side bars 11 are supported by links 13 pivotally connected at 14 with brackets 15 mounted on the rear face of the cross arm 1. The links 13 depend from the cross arm and have several openings therein for selectively receiving connecting bolts 16 that extend through the links 13 and through slots 17 in the side frame members 11. This provides a pivotal and an adjustable connection between the frame and the cross arm 1.

The bars 11 are connected together intermediate their lengths by a tie bar 18, from which a pair of upstanding members 19 extend in transversely spaced relation in positions to receive therebetween a tie link 20. The tie link 20 is shown as having a plurality of holes spaced along the length thereof for selective connection by a bolt 21 with the members 19. The forward end of the tie link 20 is pivotally connected at 22 with a bracket 23 on the cross arm 1, coaxial with the pivotal connections 14 of the side members 11. Through the members 19 and 20 and the adjustable connection at 21, the angle of cut of the plow may be adjusted so as to direct it in proper relation to the surface of the ground.

At its rear end, the frame 10 is supported on the cross member 2 from the tractor, as by means of an arm 24 connected with said member 2 and with the frame 10 for proper raising and lowering movement into and out of the ground.

The plow structure is shown more in detail in Figs. 1 to 4. It includes a plow member 25 which is V-shaped in cross section at the lower edge thereof, with an upturned rear sweeping end 26 that may be curved over the curb C. The V-shaped plow 25 has one side formed by a bar 27 that is integral with the plow 25. The bar 27 extends transversely, sufficiently to overlie the top of the curb C, with its inner end extending downwardly substantially at right angles to the major portion of the length of said bar (Fig. 4), and either formed integral with the plow or rigidly secured thereto, as by welding. A single metal sheet may be bent to form the V-shaped plow and bar, all in one piece.

At its opposite end, the bar 27 is suspended by an arm 28 from the adjacent side frame member 11, and a second arm 29 is provided in depending relation from the other companion side frame member 11 for supporting the inner side of the plow 25. These arms 28 and 29 support the plow resting on the curb. A longitudinal brace is shown at 30 extending from the lower end of the arm 28 to a suitable connection on the adjacent frame member 11.

A shoe 31 is adapted to ride on the inner edge of the curb C, being supported by bolts 32 from the projecting inner end of the bar 27, which bolts extend loosely through the bar and are permanently fixed to the shoe, with interposed coiled springs 33 yieldably urging the shoe against the surface of the curb in frictional guiding relation therewith.

Also mounted beneath the frame 10 is a moldboard, generally indicated at 34, which extends upward and rearward from the plow 25 in laterally overlapping relation with the top of the curb C. The moldboard 34 is connected at its front end by bolts 35 with the lower end of the arm 29, and it serves also to support the adjacent side of the plow 25. A pair of bolts at 35 extend through the moldboard 34 and through the plow 25 and the depending arm 29 for connecting these together and for supporting the moldboard and plow. The moldboard has a sweeping engagement with the top of the curb. It will be noted from Fig. 4 that the moldboard 34 extends laterally an appreciably greater distance than the rear end portion 26 of the plow. A brace 30' extends from the lower end of the arm 29, with which it is connected, to a connection on the adjacent frame member 11.

At the rear of the moldboard 34, a brush 36 may be provided, if desired, for sweeping engagement with the top of the curb C to remove excess dirt therefrom. The brush 36 is shown as extending laterally of the frame 10, being supported by an arm 37 that is secured rigidly to said frame.

Where the soil is especially hard or the sod heavy, full of roots, etc., suitable opening means may be provided in advance of the plow 25. In this embodiment of the invention, a coulter is used for this purpose, as indicated at 38. The coulter 38 is journaled in a pair of links 39 extending downwardly from a pivot bolt 40 mounted on the frame 10 so as to permit of raising and lowering swinging movement of the coulter. The coulter 38 is journaled on a shaft 41 from which a yoke 42 extends upwardly, with a rod 43 connected with the yoke and extending through a cross bar 44 over the frame 10 between the side members thereof in bridging relation. The cross member 44 is slotted to permit of freedom of movement of the coulter transversely to a limited extent, and the latter is urged downward by a coiled spring 45 sleeved over the rod 43 and interposed between the bottom face of the cross member 44 and the upper end of the yoke 42. The tension of this spring 45 is sufficient to urge the coulter downward in cutting engagement with the ground, and yet to permit of some yielding action in the event of the coulter striking a rock or a heavy root which cannot be cut thereby.

The operation of the curb edging plow will be apparent from the foregoing description. As the tractor or other vehicle being used therewith is drawn along the edge of the pavement, or along the curb, the rear end portion of the frame 10 is lowered to move the plow 25 into the ground to a proper depth, as desired. Any suitable means connected with the arm 2 may be used for this purpose.

The plow 25 will cut a kerf substantially V-shaped in cross section in the dirt at the inner side of the curb C and is tipped upward at an angle to the horizontal, as shown in Figs. 3 and 5, so as to direct the dirt, rocks and other materials thus loosened to form the V-shaped channel or groove V, to the top face of the curb C. The lateral deflection of the rear end of this plow will raise these materials onto the curb directly in front of the mold board 34. The latter riding over the top surface of the curb will sweep the materials off the curb onto the pavement. If needed or desired, the brush 36 can be used behind the mold board for a more effective and complete removal of the dirt from the curb.

This action leaves a neat and attractive V-shaped kerf in the soil at the inner edge of the curb, as illustrated generally at V in Figs. 1 and 2, and removes therefrom not only the grass and roots, but also any rocks or any other objects that may have lodged at the inner edge of the curb.

This edging operation can be done by power much more quickly and expeditiously than has been possible heretofore by using hand tools. It has been demonstrated that one operator, with a tool of this character, can provide an edging surface along 300 yards of curb in one-half hour, whereas it usually takes four men with hand tools as much as five days to do the same amount of work. Even then, the hand labor does not present as neat and uniform an appearance.

The curb edging plow structure being mounted on the tractor at one side thereof, follows directly along and can be guided in proper relation to the curb by the operator seated on the tractor. It is securely supported at both the front and rear ends and may be guided by steering mechanism of the tractor, an example of which is illustrated in Figs. 6 and 8 as applied to one form of tractor.

Other forms of tractors may require variations in the steering mechanisms and in the connections of the plow structure with the tractor. For example, in Fig. 12 the steering wheel 3 of the plow structure has the yoke thereof secured to an upstanding standard 46 connected by a link 47 to the conventional steering mechanism of the tractor.

Each of the plow 25 and mold board 34 may be formed of relatively thick steel plate stock, bent or shaped as desired. Castings are not required. All parts may be fabricated from available materials and elements, thereby rendering the construction relatively inexpensive. At the same time, it is rigid and secure.

The parts and plow structure can be removed readily from the tractor, either for sharpening or for use of the tractor for other purposes. Parts may be replaced readily, without requiring skilled labor for this purpose.

While the invention has been illustrated and described in certain embodiments, it is recognized that variations and changes may be made therein without departing from the invention as set forth in the claims.

I claim:

1. A curb edging plow adapted to be moved along an edge of a curb, comprising a plow having an elongated body portion substantially V-shaped in cross-section with a forward edge cutting portion arranged to excavate a substantially V-shaped cut in the earth adjacent the curb and to direct the material removed thereby along and over the rear end portion to the top of the curb, a mold board deflector connected at one end with the plow and extending laterally thereof in position for sweep engagement with the top surface of the curb to direct the material deposited thereon off the curb onto an adjacent pavement, an arm connected with the plow and extending laterally therefrom, and a curb guide shoe connected with the outer end of the arm spaced from said plow and in position for guilding relation with the opposite side of the curb from the plow to hold the plow in close proximity thereto.

2. A curb edging plow adapted to be moved along an edge of a curb, comprising a plow having an elongated body portion substantially V-shaped in cross-section with a forward edge cutting portion arranged to excavate a substantially V-shaped cut in the earth adjacent the curb and to direct the material removed thereby along and over the rear end portion to the top of the curb, a mold board deflector connected at one end with the plow and extending laterally thereof in position for sweep engagement with the top surface of the curb to direct the material deposited thereon off the curb onto an adjacent pavement, an arm connected with the plow and extending laterally therefrom, a curb guide shoe connected with the outer end of the arm in position for guiding relation with a side of the curb to hold the plow in close proximity thereto, and means yieldably connecting the curb guide shoe with said arm and holding the shoe yieldably in guiding relation with the curb.

3. A curb edging plow adapted to be moved along an edge of a curb, comprising a plow having an elongated body portion substantially V-shaped in cross-section with a forward edge cutting portion arranged to excavate a substantially V-shaped cut in the earth adjacent the curb and to direct the material removed thereby along and over the rear end portion to the top of the curb, a mold board deflector connected at one end with the plow and extending laterally thereof in position for sweep engagement with the top surface of the curb to direct the material deposited thereon off the curb onto an adjacent pavement, an arm connected with the plow and extending laterally therefrom, a curb guide shoe connected with the outer end of the arm in position for guiding relation with a side of the curb to hold the plow in close proximity thereto, means yieldably connecting the curb guide shoe with said arm and holding the shoe yieldably in guiding relation with the curb, and means for adjusting the position of said guide shoe with respect to said arm.

4. A curb edging plow adapted to be moved along an edge of a curb, comprising a frame having a plow member attached thereto, said plow member having an elongated body portion substantially V-shaped in cross section with a forward edge cutting portion arranged to excavate a substantially V-shaped cut in the earth adjacent the curb and to direct the material removed thereby along and over the rear end portion to the top of the curb, a mold board deflector connected at one end with the plow member and extending laterally thereof in position for sweep engagement with the top surface of the curb to direct the material deposited thereon off the curb onto an adjacent pavement, a shoe connected with the plow member and having a curb guiding face toward the plow in position to ride upon the opposite side of the curb from the plow member for gauging the depth of cut of the plow with respect thereto, and a brush member attached to said frame rearwardly of said plow member and projecting laterally beyond the extent of said mold board deflector in sweep engagement with the top surface of the curb.

5. A curb edging plow adapted to be moved along an edge of a curb, comprising a plow having an elongated body portion substantially V-shaped in cross section with a forward edge cutting portion arranged to excavate a substantially V-shaped cut in the earth adjacent the curb and to direct the material removed thereby along and over the rear end portion to the top of the curb, an arm connected with the plow and extending laterally therefrom, and a curb guide shoe connected with the outer end of the arm spaced from said plow and having a curb guiding face toward the plow in position for guiding relation with the opposite side of the curb from the plow to hold the plow in close proximity thereto.

6. A curb edging plow adapted to move along an edge of a curb comprising a frame having a plow member attached thereto, said plow member having an elongated body portion substantially V-shaped in cross section with a forward edge cutting portion arranged to excavate a substantially V-shaped cut in the earth adjacent the curb and to direct the material removed thereby along and over the rear end portion of the plow member to the top of the curb, an arm connected with the plow member and extending laterally therefrom, a curb guide shoe connected with the outer end of the arm in position for guiding relation with the opposite side of the curb from the plow member to hold the plow member in close proximity thereto, and means yieldably connecting the curb guide shoe with said arm and holding the shoe yieldably in guiding relation with the curb.

7. A curb edging plow adapted to move along an edge of a curb comprising a frame having a plow member attached thereto, said plow member having an elongated body portion substantially V-shaped in cross section with a forward edge cutting portion arranged to excavate a substantially V-shaped cut in the earth adjacent the curb and to direct the material removed thereby along and over the rear end portion of the plow member to the top of the curb, an arm connected with the plow member and extending laterally therefrom, a curb guide shoe connected with the outer end of the arm in position for guiding relation with the opposite side of the curb from the plow member to hold the plow member in close proximity thereto, means yieldably connecting the curb guide shoe with said arm and holding the shoe yieldably in guiding relation with the curb, and a brush member attached to said frame rearwardly of said plow member and projecting laterally beyond the extent of said mold board deflector for sweep engagement with the top surface of the curb.

8. A curb edging plow adapted to be moved along an edge of a curb, comprising a plow having an elongated body portion with a forward edge cutting portion arranged to excavate a cut in the earth adjacent the curb and to direct the material removed thereby along and over the rear end portion to the top of the curb, an arm connected with the plow and extending laterally therefrom, and a curb guide shoe connected with the outer end of the arm spaced from said plow and having a curb guiding face toward the plow in position for guiding relation with the opposite side of the curb from the plow to hold the plow in close proximity thereto.

References Cited in the file of this patent

UNITED STATES PATENTS

| Number | Name | Date |
|---|---|---|
| 861,304 | Motherwell | July 30, 1907 |
| 962,785 | Reichert | June 28, 1910 |
| 998,055 | Vondracek | July 18, 1911 |
| 1,033,612 | Nelson | July 23, 1912 |
| 1,140,233 | Anderson | May 18, 1915 |
| 1,337,076 | Jones | Apr. 13, 1920 |
| 1,505,685 | Allen | Aug. 19, 1924 |
| 1,562,174 | Johnson | Nov. 17, 1925 |
| 1,577,341 | Mettler | Mar. 16, 1926 |
| 1,892,795 | Wolf | Jan. 3, 1933 |
| 2,209,946 | Black | Aug. 6, 1940 |
| 2,476,461 | Smith | July 19, 1949 |
| 2,587,721 | Garnsey | Mar. 4, 1952 |
| 2,628,547 | Hester | Feb. 17, 1953 |
| 2,748,685 | Sogar | June 5, 1956 |